(12) United States Patent
Chandra et al.

(10) Patent No.: US 8,411,608 B2
(45) Date of Patent: Apr. 2, 2013

(54) EFFICIENT AND RELIABLE MULTICAST OVER A WI-FI NETWORK

(75) Inventors: Ranveer Chandra, Kirkland, WA (US); Sandeep P. Karanth, Bangalore (IN); Thomas Moscibroda, Redmond, WA (US); Vishnu Navda, Bangalore (IN); Jitendra D. Padhye, Redmond, WA (US); Ramachandran Ramjee, Bangalore (IN); Lenin Ravindranath Sivalingam, Cambridge, MA (US)

(73) Assignee: Microsoft Corporation, Redmond, WA (US)

( * ) Notice: Subject to any disclaimer, the term of this patent is extended or adjusted under 35 U.S.C. 154(b) by 414 days.

(21) Appl. No.: 12/714,360

(22) Filed: Feb. 26, 2010

(65) Prior Publication Data
US 2011/0211517 A1     Sep. 1, 2011

(51) Int. Cl.
    H04H 20/71    (2008.01)
(52) U.S. Cl. ...... 370/312; 370/338; 370/390; 455/414.1
(58) Field of Classification Search .................. 370/312, 370/338, 390; 455/414.1
    See application file for complete search history.

(56) References Cited

U.S. PATENT DOCUMENTS

| | | | |
|---|---|---|---|
| 7,349,349 | B2 | 3/2008 | Acharya et al. |
| 7,525,966 | B2 | 4/2009 | Fujinami |
| 2007/0064673 | A1 | 3/2007 | Bhandaru et al. |
| 2007/0118742 | A1 | 5/2007 | Abhishek et al. |
| 2007/0189247 | A1 | 8/2007 | Wang et al. |
| 2007/0298779 | A1 | 12/2007 | Wolman et al. |
| 2008/0112350 | A1 | 5/2008 | Nanda et al. |
| 2009/0046613 | A1 | 2/2009 | Gaur |
| 2009/0052467 | A1* | 2/2009 | Kaidar et al. ............... 370/469 |
| 2011/0083035 | A1* | 4/2011 | Liu et al. ..................... 714/4.1 |

OTHER PUBLICATIONS

Lai, et al., "Improved P2P Streaming in Wireless Networks Utilizing Access Point P2P Agents", Ninth IEEE International Symposium on Multimedia, Dec. 2007, pp. 58-62.
Liu, Hang, "Video Transmission over Wireless LAN", Wireless and Optical Communications Conference (WOCC), Apr. 2005, pp. 1-23.
Lacan, et al., "Evaluation of Error Control Mechanisms for 802.11b Multicast Transmissions", Modeling and Optimization in Mobile, Ad Hoc and Wireless Networks,4th International Symposium on, Apr. 3-6, 2006.

(Continued)

*Primary Examiner* — Pao Sinkantarakorn
*Assistant Examiner* — Richard K Chang
(74) *Attorney, Agent, or Firm* — Lyon & Harr, LLP; Mark A. Watson

(57) ABSTRACT

A "Wi-Fi Multicaster" provides a practical and efficient Wi-Fi multicast system for environments having potentially large numbers of Wi-Fi clients. Significantly, the Wi-Fi Multicaster does not require any changes to the 802.11 protocol, or to the underlying Wi-Fi infrastructure. In various embodiments, the Wi-Fi Multicaster uses pseudo-broadcast, and augments it with destination control, association control and optional proactive FEC (forward error correction) to improve multicast performance. More specifically, the Wi-Fi Multicaster system converts multicast packets to targeted unicast transmissions. To minimize the amount of airtime consumed, the Wi-Fi Multicaster uses destination control in combination with various algorithms for association control. Further, in various embodiments, the Wi-Fi Multicaster includes an adaptive, proactive FEC scheme to reduce overall packet losses. Finally, to overcome the challenges posed by encryption protocols such as 802.1x, the Wi-Fi Multicaster uses a "virtual multicast interface" that allows clients to "share" a common key for each multicast.

19 Claims, 4 Drawing Sheets

OTHER PUBLICATIONS

Al-Shaer, et al., "Application-Layer Group Communication Server for Extending Reliable Multicast Protocols Services", Proceedings of the 1997 International Conference on Network Protocols, Oct. 28-31, 1997.

Chandra, et al., "MultiNet: Connecting to Multiple IEEE 802.11 Networks using a Single Wireless Card", IEEE INFOCOM, Mar. 2004.

Banerjee, et al., "Scalable Application Layer Multicast", Proceedings of the ACM SIGCOMM 2002 conference on Applications, technologies, architectures, and protocols for computer communications, Aug. 19-23, 2002.

Cao, et al., "Reliable Multicast via Satellites", Proceedings of the International Conference on Information Technology: Coding and Computing, Apr. 2-4, 2001, pp. 183-188.

Chaporkar, et al., "An Adaptive Strategy for Maximizing Throughput in MAC Layer Wireless Multicast", Proceedings of the 5th ACM international symposium on Mobile ad hoc networking and computing, May 24-26, 2004, pp. 256-267.

Chen, et al., "Optimizing Multicast Performance in Large-Scale WLANs", Proceedings of the 27th International Conference on Distributed Computing Systems, Jun. 25-27, 2007.

Chou, et al., "Low Latency Multimedia Broadcast in Multi-rate Wireless Meshes." in Proc. 1st IEEE Workshop on Wireless Mesh Networks (WIMESH), Sep. 2005.

Dujovne, et al., "Multicast in 802.11 WLANS: An Experimental Study", Proceedings of the 9th ACM international symposium on Modeling analysis and simulation of wireless and mobile systems, Oct. 2-6, 2006.

Garyfalos, et al., "A Flexible Overlay Architecture for Mobile IPv6 Multicast", IEEE Journal on Selected Areas in Communications, vol. 23, No. 11, Nov. 2005, pp. 2194-2205.

Gui, et al., "Overlay Multicast for MANETs using Dynamic Virtual Mesh", Wireless Networks, vol. 13, Issue 1, Jan. 2007, pp. 77-91.

Heusse, et al., "Performance Anomaly of 802.11 b", IEEE INFOCOM, Apr. 2003.

Jain, et al., "MAC Layer Multicast in Wireless Multihop Networks", First International Conference on Communication System Software and Middleware (Comsware), Aug. 2006, pp. 1-10.

Katti, et al., "XORs in the Air: Practical Wireless Network Coding", ACM SIGCOMM Computer Communication Review, vol. 36, Issue 4, Sep. 11-15, 2006.

Kuri, et al., "Reliable Multicast in Multi-Access Wireless LANs", Wireless Networks, vol. 7, Issue 4, Aug. 1, 2001, pp. 359-369.

McAuley, Anthony J., "Reliable Broadband Communications Using Burst Erasure Correcting Code", ACM SIGCOMM Computer Communication Review, vol. 20, Issue 4, Sep. 1990, pp. 297-306.

McKinley, et al., "A Study of Adaptive Forward Error Correction for Wireless Collaborative computing", IEEE Transactions on Parallel and Distributed Systems, vol. 13, No. 9, Sep. 2002, pp. 936-947.

Murty, et al., "Designing High Performance Enterprise Wi-Fi Networks", Proceedings of the 5th USENIX Symposium on Networked Systems Design and Implementation, Apr. 16-18, 2008, pp. 1-16.

Pang, et al., "A First Look at Modern Enterprise Traffic", Proceedings of the 5th ACM SIGCOMM conference on Internet Measurement, Oct. 19-21, 2005, pp. 1-14.

Radoslavov, et al., "A Comparison of Application-Level and Router-Assisted Hierarchical Schemes for Reliable Multicast", IEEE/ACM Transactions on Networking, vol. 12, Issue 3, Jun. 2004. pp. 469-482.

Rizzo, et al., "RMDP: An FEC-based Reliable Multicast Protocol for Wireless Environments", ACM SIGMOBILE Mobile Computing and Communications Review, vol. 2 , Issue 2, Apr. 1998, pp. 23-31.

Rozner, et al., "ER: Efficient Retransmission Scheme for Wireless LANs", Proceedings of the 2007 ACM CoNEXT conference, Dec. 10-13, 2007.

Rubenstein, et al., "Improving Reliable Multicast Using Active Parity Encoding Services (APES)", Computer Networks: The International Journal of Computer and Telecommunications Networking, vol. 44, Issue 1, Jan. 2004, pp. 1-26.

Tang, et al., "MAC Layer Broadcast Support in 802.11 Wireless Networks", This paper appears in: MILCOM 2000. 21st Century Military Communications Conference Proceedings , Oct. 2000, pp. 544-548.

Xu, et al., "An Adaptive Redundancy Technique for Wireless Indoor Multicasting", Proceedings of the Fifth IEEE Symposium on Computers and Communications, Jul. 4-6, 2000, pp. 607-614.

\* cited by examiner

EFFICIENT AND RELIABLE MULTICAST OVER A WI-FI NETWORK

BACKGROUND

1. Technical Field

A "Wi-Fi Multicaster" provides various techniques for implementing a network-based proxy server that performs various functions including client association, rate control and optional redundancy optimization for enabling efficient and reliable multicasting in a Wi-Fi network to potentially large numbers of clients using feedback from a "client proxy" software component running on each of the multicast clients.

2. Related Art

Multimedia IP multicast applications, such as live lecture broadcasts, are increasingly being used in enterprise and campus networks. For example, in a recent enterprise traffic study, 5-10% of all payload bytes were attributed to multicast streaming. At the same time, an increasingly large number of hosts in enterprise environments are using Wi-Fi for their basic connectivity. Thus, it would be useful for enterprise Wi-Fi networks to efficiently support IP multicasts.

Unfortunately, the peculiarities of widely adopted IEEE 802.11 protocols create several well-known problems with respect to multicasting. First, the existing 802.11 protocol does not require an ACK for multicast transmissions. Consequently, lost multicast packets are not retransmitted at the MAC layer, and some of the receivers can experience high loss rates. Second, since there are no ACKs, the MAC-level sender (generally, the access point (AP)) does not know whether any particular frame might have collided with another frame and thus, does not implement backoffs, thus resulting in unfairness to other unicast clients that do implement backoff protocols. Third, the link data rate is static and, in order to guarantee coverage to all associated clients, is typically fixed to one of the low basic rates available (e.g. ⅙ Mbps for 802.11b/g). This limits the rate at which multicast data can be sent. For example, high-definition video cannot be sent via conventional multicast protocols. Fourth, the low link data rate coupled with the packet-fair Wi-Fi MAC can significantly reduce the throughput of any contending unicast client. This is known as the "rate-anomaly problem". Fifth, background multicast chatter can reduce energy savings for clients operating in power-save mode (PSM), since clients that are not subscribed to any multicast group have to wake up unnecessarily to receive these packets.

These problems are so severe, that many organizations simply do not permit multicast traffic over Wi-Fi links. One simple approach that has been examined as a possible solution to these problems is to convert the multicast traffic into a group of unicast sessions, one for each client. Since unicast packets are acknowledged and are subject to retransmission and rate adaptation by the AP, lower losses are observed in combination with better MAC fairness and effective high data rate transmission for the multicast stream. Unfortunately, this simple approach requires very large bandwidth capabilities (given multiple clients), thus defeating the very purpose of multicast.

In wired networks, multicast problems are often solved using application level multicasting. However, such solutions are not considered feasible for use in Wi-Fi networks. As a result, a number of solutions have been proposed for multicast in Wi-Fi networks. However, most of these solutions require significant changes to the 802.11 protocol, making it difficult, if not impossible, to deploy such solutions in the real world given the wide, almost universal, adoption of the 802.11 protocol and associated hardware. Even prototyping such solutions can be difficult since conventional 802.11-based hardware is designed to operate within the existing 802.11 protocol, and thus most of them have been evaluated via analysis or simulations only.

For example, some of the specific problems identified with respect to Wi-Fi multicasting include maximizing the number of users (MNU), balancing the load among APs (BLA), and minimizing the load of APs (MLA). These NP-hard problems have typically been addressed using approximate centralized and distributed algorithms, with only simulations being used to evaluate the performance of these algorithms. Unfortunately, such algorithms are generally restricted to the case where each user may subscribe to only one multicast flow.

Rate adaptation for broadcast/multicast is a difficult problem because of the lack of ACK-based feedback in broadcast/multicast transmissions. On the other hand, enabling ACKs for multicast would result in an ACK explosion problem, with a large increase in the MAC overhead and the need for sophisticated schemes to coordinate the ACKs sent by the clients of the multicast group. Several projects have suggested various techniques for solving the feedback problem. Unfortunately, these solutions require changing the 802.11 MAC. Consequently, given the many millions of hardware devices deployed using existing 802.11 standards, such changes to the 802.11 MAC would generally require replacing the existing 802.11 AP hardware and could leave potentially millions of existing clients without the multicast capabilities offered by changing the 802.11 MAC.

For example, in one such proposed solution, the sender sends a Request to Send (RTS) addressed to all its groups' members and waits to receive a Clear to Send (CTS) signal from them. As long as the sender is able to decode the CTS or detects that the channel is busy during the expected CTS time interval, it proceeds with the data transmission. In a related scheme, the feedback problem is addressed by electing a "leader" client that is responsible for generating an ACK. Packet losses at other group members are communicated by sending negative ACKs (also referred to as negative acknowledgements or "NAKs") that may collide with the ACKs transmitted by the leader, thereby triggering retransmission by the access point. Unfortunately, apart from requiring changes to the 802.11 MAC, the aforementioned "solutions" cater only to the case of single-rate wireless LANs. Other "solutions" attempt to achieve latency broadcast in multi-rate mesh networks by assuming that the MAC layer of future wireless meshes would support rate adaptation for multicast. However, such assumptions are based on adapting proposed dual-tone-based MAC systems for designing a multi-rate MAC. In other words, such suggestions again require changes to the existing 802.11 MAC and/or to the wireless access points.

There is a large body of work with respect to the use of forward error correction (FEC) for improving multicast reliability. For example, one such scheme combines FEC with channel estimation and NAK-based feedback for retransmissions. This scheme has been shown, via simulations, to increase reliability without sacrificing channel efficiency. In another scheme, a network-based proxy is used that implements block erasure codes and NAK feedbacks from receivers to enable adaptive FEC support for multicast in collaborative computing applications. Yet another scheme suggests a FEC-based reliable multicast protocol that uses both FEC and retransmissions for use over the "MBone" (i.e., the proposed "multicast backbone") and wireless mobile networks. Recently, yet another scheme was suggested that considered the effectiveness of using XOR-based network-coding for retransmission in wireless broadcast/multicast applications.

Several application layer multicast protocols have also been proposed, though IP multicast is not widely used in the Internet. For example, in one such proposal, data delivery occurs over an overlay multicast network consisting of end-hosts. In a related scheme, use of application-layer servers is proposed. Unfortunately, although such protocols consume lower bandwidth compared to using multiple unicast flows to every client, they are not designed for wireless multicast. For example, in a WLAN setting, forwarding data between wireless clients can unnecessarily increase airtime, since every wireless transmission goes through the AP.

Finally, there has been significant interest in improving performance of wireless multicast in the context of mobile and multi-hop wireless networks. For example, in one such scheme, multicast transmission happens over an overlay network that efficiently adapts to changes in network topology with minimal control traffic overhead. In another such scheme, extensions to 802.11 MAC have been proposed to reduce multicast packet losses using a distributed channel reservation protocol. Unfortunately, as noted above, there are serious infrastructure problems associated with requiring changes to the existing 802.11 MAC.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In general, a "Wi-Fi Multicaster," as described herein, provides a practical and efficient system for improving multicast performance to clients (i.e., mobile devices having wireless connectivity such as notebooks, netbooks, PDA's, desktops, smart phones, media players, etc.) over Wi-Fi networks while simultaneously optimizing the performance of the network, and minimizing the Wi-Fi Multicaster's impact on other wireless traffic. Specifically, one particular metric that captures these two objectives is the airtime consumed by multicast traffic. Consequently, the Wi-Fi Multicaster minimizes the airtime consumed by multicast traffic. It should also be understood that while the following discussion focuses on 802.11-based Wi-Fi networks for purposes of explanation, the concepts and techniques described herein can be easily adapted to other Wi-Fi-like technologies such as White-Space networks or the like.

In contrast to conventional proposals or schemes for Wi-Fi multicasting, the Wi-Fi Multicaster focuses on single hop, infrastructure wireless networks and requires no changes to the existing IEEE 802.11 standard. Furthermore, the Wi-Fi Multicaster does not require any changes to the functionality of existing 802.11 based access points (APs). While a "client proxy" software component of the Wi-Fi Multicaster is installed on clients receiving Wi-Fi multicasts, only those clients that wish to participate in multicast sessions need software changes. Clients that do not wish to join multicast sessions require no changes at all to continue communications within the same Wi-Fi network. A network-based "proxy server" component of the Wi-Fi Multicaster (also referred to herein as a "central controller" component of the Wi-Fi Multicaster) communicates directly with APs to direct various functions, including client association, optional rate control, and optional redundancy optimization for multicast by using feedback from the client proxy software running on each of the multicast clients.

More specifically, the network-based proxy server component of the Wi-Fi Multicaster provides a "central controller" that sits between one or more conventional multicast servers and one or more conventional APs. The central controller intercepts multicast packets from any of the multicast servers and converts them to unicast packets targeted to certain selected clients (dynamically selected from a larger group of clients receiving one or more multicasts), thereby allowing clients to subscribe to multiple multicast flows. The "selected" clients are referred to herein as "target clients". The unicast packets are then provided to the APs for transmission to the selected clients. Other clients (i.e., those clients that have not been selected to be the target client) in the group receive these unicast packets by listening in a "promiscuous mode" using "pseudo-broadcast" techniques, as described in further detail herein.

Note however, that in various embodiments, the "central controller" component of the Wi-Fi Multicaster can also directly act as a multicast server in addition to intercepting multicast packets from one or more multicast servers. In this case, packets of the multicast are directly formed by the central controller as unicast packets rather than being converted from intercepted multicast packets. The unicast packets are then provided to the APs for transmission to the clients. In all other respects, the behavior of the central controller component of the Wi-Fi Multicaster is the same whether it is intercepting packets from multicast servers and/or acting as a multicast server itself.

Further, to minimize the amount of airtime consumed, in various embodiments, the Wi-Fi Multicaster groups the multicast clients at APs in a way that minimizes the amount of airtime consumed. This is referred to herein as "association control". One exemplary association control algorithm employed by the Wi-Fi Multicaster takes a non-trivial greedy-approach that has been analytically proven to be asymptotically optimal. Note that in various embodiments, client association to particular access points is periodically evaluated, and that this association may change over time using the association control techniques described herein.

Next, the Wi-Fi Multicaster selects a target client. In various embodiments, it takes a conservative approach by selecting the client with the "worst" connectivity at each AP, and makes it the target client for that AP. Note that the target is updated dynamically, to compensate for changes in Wi-Fi environment and traffic patterns (e.g., signal strength between clients and APs tends to fluctuate over time for a variety of reasons). As such, the target client for any particular AP may change over time. This is referred to herein as "destination control".

Since non-target clients listen to packets in promiscuous mode, they may not receive some of the packets (they do not send ACKs if they receive a packet). Therefore, to overcome these losses, in various embodiments, the Wi-Fi Multicaster proactively adds forward error correction (FEC) packets to the multicast stream(s). As described in further detail herein, the Wi-Fi Multicaster uses an adaptive algorithm to determine the amount of FEC needed. This adaptive algorithm has been observed to be successful in reducing losses to all multicast clients with little overhead. However, any known FEC techniques may be used, if desired, to introduce FEC packets into the multicast stream(s).

In addition to reducing airtime (via association control and destination control) and losses (via FEC), the Wi-Fi Multicaster advantageously reduces multicast chatter in the network since it converts multicast traffic to unicast. As such, APs do not advertise Wi-Fi Multicaster traffic in their beacons as actual multicast traffic, thus preventing unnecessary wakeups for clients operating in power-save mode (PSM) that are not part of any multicast group related to transmissions of the Wi-Fi Multicaster.

As noted above, non-target clients operate in "promiscuous mode" when receiving ("over-hearing") the unicast packets of the multicast. However, most corporate or enterprise Wi-Fi networks operate using some version of the IEEE 802.11 standard (e.g., 802.11a, 802.11b, 802.11g, 802.11n, etc.), which encrypts traffic with a unique key for each Wi-Fi client. Therefore, while other clients can sniff the packets, they cannot decrypt them. To address this issue, the Wi-Fi Multicaster implements a mechanism referred to herein as a "virtual multicast" interface, where a separate virtual Wi-Fi interface is created for each of the client's multicast sessions. A "security session key" for the virtual multicast interface is then shared among the clients of the respective multicast group, allowing those clients to decrypt (only) the appropriate multicast group packets received in promiscuous mode.

In view of the above summary, it is clear that the Wi-Fi Multicaster described herein provides various unique techniques for enabling efficient and reliable multicasting in a Wi-Fi network. In addition to the just described benefits, other advantages of the Wi-Fi Multicaster will become apparent from the detailed description that follows hereinafter when taken in conjunction with the accompanying drawing figures.

DESCRIPTION OF THE DRAWINGS

The specific features, aspects, and advantages of the claimed subject matter will become better understood with regard to the following description, appended claims, and accompanying drawings where:

DETAILED DESCRIPTION OF THE EMBODIMENTS

Figure 1:
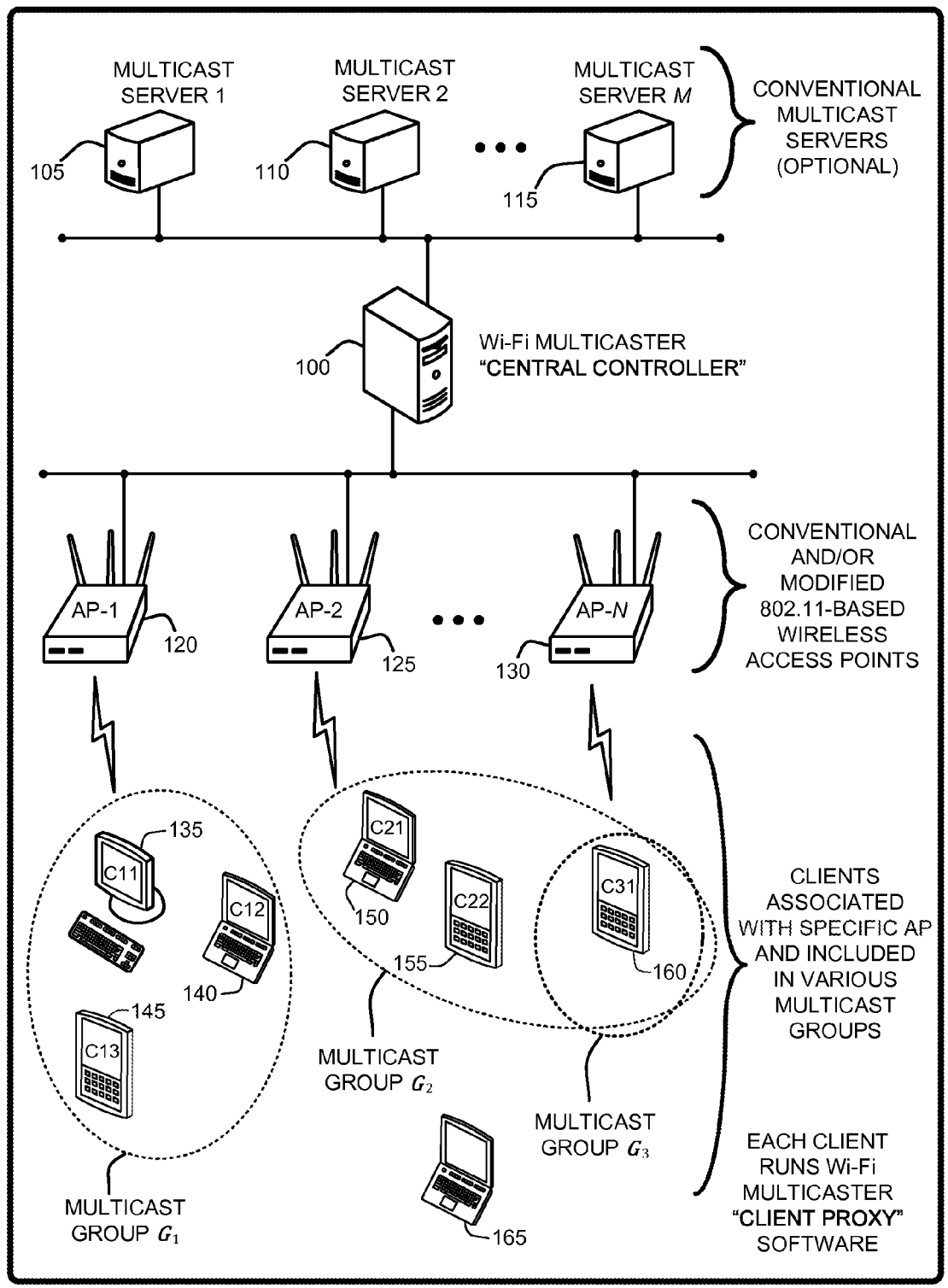
FIG. 1 illustrates a general system diagram that shows interconnections between major functional components for enabling efficient and reliable multicasting within a Wi-Fi network using a "Wi-Fi Multicaster," as described herein.

In the following description of the embodiments of the claimed subject matter, reference is made to the accompanying drawings, which form a part hereof, and in which is shown by way of illustration specific embodiments in which the claimed subject matter may be practiced. It should be understood that other embodiments may be utilized and structural changes may be made without departing from the scope of the presently claimed subject matter.

1.0 Introduction:

A "Wi-Fi Multicaster", as described herein, provides a practical and efficient Wi-Fi multicast system for environments having potentially large numbers of Wi-Fi clients. "Clients", as discussed herein, includes any mobile device having wireless 802.11-based networking capabilities. Such mobile devices include, but are not limited to, notebooks, netbooks, PDA's, desktop computers, smart phones, media players, etc.

It should also be understood that while the following discussion focuses on 802.11-based Wi-Fi networks for purposes of explanation, the concepts and techniques described herein can be easily adapted to other Wi-Fi-like technologies such as White-Space networks or the like.

In general, the Wi-Fi Multicaster implements a network-based proxy server (i.e., a "central controller") that performs functions including client association, rate control and optional redundancy optimization for enabling efficient and reliable multicasting in a Wi-Fi network to potentially large numbers of clients using feedback from a "client proxy" software component of the Wi-Fi Multicaster running on each of the multicast clients. Advantageously, the Wi-Fi Multicaster does not require any changes to the 802.11 protocol, or to the underlying Wi-Fi infrastructure. In various embodiments, the Wi-Fi Multicaster uses pseudo-broadcast, and augments it with destination control, association control and optional proactive FEC (forward error correction) to improve multicast performance.

More specifically, the Wi-Fi Multicaster sits between one or more conventional multicast servers and one or more conventional APs (though the Wi-Fi Multicaster can also directly act as a multicast server, if desired), and converts multicast packets broadcast by the multicast servers to targeted unicast transmissions. These unicast transmissions are then provided to the APs for transmission to one or more clients or groups of clients, with each client locally running a "client proxy" software component of the Wi-Fi Multicaster. To minimize the amount of airtime consumed (i.e., to optimize the performance of the network and to minimize the interference caused by the network to other traffic), the Wi-Fi Multicaster uses "destination control" (see Section 2.3) techniques for specifying a single "target client" for each AP in combination with various algorithms for "association control" (see Section 2.4) for assigning clients to specific APs to minimize AP airtime. Further, in various embodiments, the Wi-Fi Multicaster includes an adaptive, proactive FEC scheme to reduce overall packet losses (see Section 2.5). Finally, to overcome the challenges posed by encryption protocols such as 802.1x, the Wi-Fi Multicaster uses a "virtual multicast interface" (see Section 2.7) that allows clients to "share" a common key for each multicast.

1.1 System Overview:

As noted above, the "Wi-Fi Multicaster," provides various techniques for enabling efficient and reliable multicasting in a Wi-Fi network. The processes summarized above are illustrated by the general system diagram of FIG. 1. In particular, the system diagram of FIG. 1 illustrates the interrelationships between functional elements of a Wi-Fi network within which the Wi-Fi Multicaster is used to manage multicasting operations to a plurality of clients.

In general, as illustrated by FIG. 1, the Wi-Fi Multicaster consists of two primary components, including a "central controller" 100 that communicates directly with one or more APs (120, 125, 130) in response to client feedback information provided by one or more clients (135 through 165).

The "central controller" 100 uses the client feedback information to perform functions including multicast group subscriptions for each individual client, client assignment control operations (for directing individual clients to associate with specific APs), client destination control operations for identifying a specific client for each AP and each multicast group served at this AP as the "target client", and optional proactive FEC operations.

The "central controller" 100 also either intercepts multicasts from one or more conventional multicast servers (105, 110, 115), and converts those multicasts to unicasts directed to the target client at one or more AP (depending upon which multicast groups are being serviced via each AP), or directly generates such multicasts from locally available content or live inputs to the central controller.

The target client at each AP (120, 125, 130) receives one or more unicasts from its associated AP, while all other clients in the same multicast group or groups as the target client receive those unicasts by listening in promiscuous mode via a "virtual multicast interface" (see Section 2.7). In general, this virtual multicast interface addresses encryption key issues by allowing non-target clients to decrypt the unicast directed to the target client by allowing every client in each individual multicast group to share "security session keys". More specifically, each client (135 through 165), uses the virtual multicast interface to establish a unique key for each multicast group to which it is interested. These keys are then provided by each client (135 through 165) to the Wi-Fi Multicaster central controller (100), which then multicasts the keys to all of the clients of each of the respective multicast groups via the APs (120, 125, 130) associated with those clients. Each client (135 through 165) then possess the keys necessary to decrypt the unicast transmission intended for the target client, even of that target client periodically changes during broadcast of that unicast transmission.

Note that FIG. 1 is discussed in further detail in Section 2.2 following a more detailed discussion of various components of the Wi-Fi Multicaster.

Figure 2:
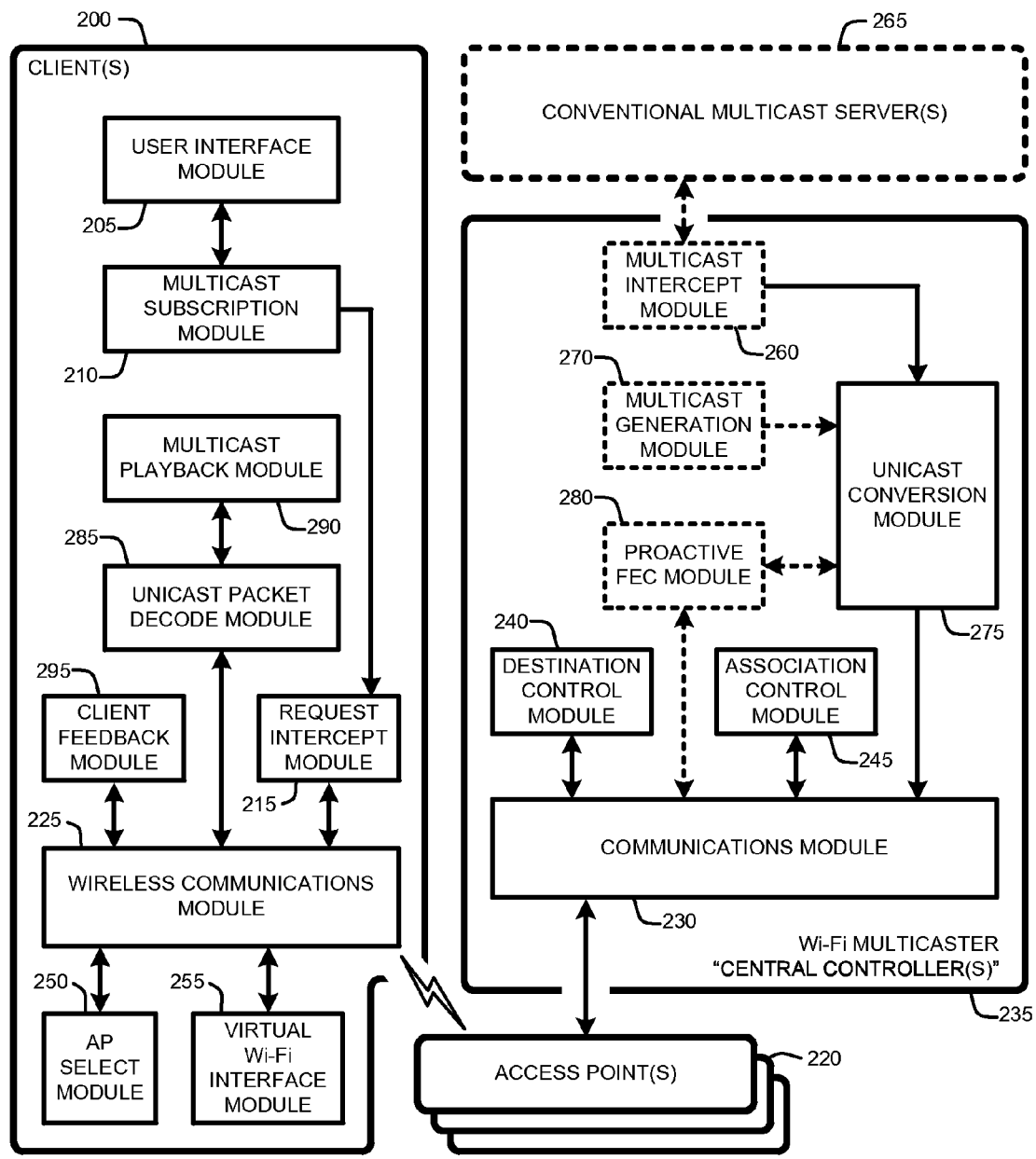
FIG. 2 provides an exemplary architectural flow diagram that illustrates program modules for implementing various embodiments of the Wi-Fi Multicaster, as described herein.

FIG. 2 provides a general system diagram that illustrates program modules for implementing various embodiments of the Wi-Fi Multicaster, showing interaction between clients and the Wi-Fi Multicaster central server via one or more access points, as described herein. Furthermore, while the system diagram of FIG. 2 illustrates a high-level view of various embodiments of the Wi-Fi Multicaster, FIG. 2 is not intended to provide an exhaustive or complete illustration of every possible embodiment of the Wi-Fi Multicaster, as described throughout this document.

In addition, it should be noted that any boxes and interconnections between boxes that may be represented by broken or dashed lines in FIG. 2 represent alternate embodiments of the Wi-Fi Multicaster described herein, and that any or all of these alternate embodiments, as described below, may be used in combination with other alternate embodiments that are described throughout this document. Further, it should also be noted that the various program "modules" described below as operating within each client 200 jointly form the aforementioned "client proxy" software component of the overall Wi-Fi Multicaster.

In general, as illustrated by FIG. 2, various processes enabled by the Wi-Fi Multicaster begin operation on one or more clients 200 by using a user interface module 205 to submit one or more requests to a multicast subscription module 210 to join or subscribe to one or more multicasts. Client proxy software running on the client 200 includes a request intercept module 215 that intercepts multicast subscription requests rather than allowing the client to send those requests to a multicast server via an access point 220 as would be the case with a conventional multicasting scheme.

The request intercept module 315 then passes all intercepted subscription requests (including requests to leave or discontinue a particular multicast session) to a wireless communications module 225 of the client. The wireless communications module 225 then sends the intercepted subscription requests to a communications module 230 of a Wi-Fi Multicaster central controller 235 via the access point 220. Note that each client 200 will initially be associated with a particular access point 220 using conventional 802.11 based association rules. However, as discussed below with respect to "association control" the initial client/AP association may be changed by the Wi-Fi Multicaster central controller 235 based on the association control process described in Section 2.4

Subscription requests from all clients 200 received by the Wi-Fi Multicaster central controller 235 are passed to a destination control module 240 and an association control module 245. In general, as discussed in further detail in Section 2.3, the destination control module 240 acts to select a single "target client" at each AP for each multicast group, while the association control module 245 (see Section 2.4) acts to assign particular clients 200 to specific access points 220. Note that actual client 200 association to particular access points is performed by sending client assignment information from the Wi-Fi Multicaster central controller 235 back to each individual client. An AP select module 250 on the client 200 then uses this information to direct the wireless communication module 225 to associate with the specific access point 220 determined by the association control module 245 of the Wi-Fi Multicaster central controller 245.

Each client 200 includes a "virtual Wi-Fi interface" module 255 (see Section 2.7) that creates a virtual Wi-Fi interface for each multicast group that the client is subscribed to. Each virtual interface is given a separate virtual MAC address that has a separate session key. The virtual Wi-Fi interface module 255 of each client then shares the security session keys for each of its virtual multicast interfaces with the Wi-Fi Multicaster central controller 235, which then multicasts those keys to all other clients of each of the respective multicast groups. The other clients 200 then use the received keys to decode their multicast group's packets that they receive (as unicast) in promiscuous mode. Note that this sharing of keys for the virtual multicast interfaces allows each client to decode the unicast sent to targets clients regardless of which client is the target client at any particular time. As a result, security is protected by ensuring that the key corresponding to the actual MAC address of each client is never shared.

In general, once each client 200 has been assigned to an access point 220, a target client has been selected for each access point, and "virtual" security session keys for corresponding multicast groups to which each client is subscribed have been shared, the Wi-Fi Multicaster central controller 235 begins unicasting those multicast packets to the target client at each access point. The target client will receive these packets just like regular unicast traffic. All other clients 200 receive those unicasts by listening in promiscuous mode and using the shared keys (of the corresponding virtual multicast interfaces) to decode the received unicasts. In particular, as noted above, the Wi-Fi Multicaster central controller 235 either uses a multicast intercept module 260 to intercept one or more multicasts from one or more conventional multicast servers 265 and/or uses a multicast generation module 270 to generate its own multicasts from stored or live multimedia content. In either case, the Wi-Fi Multicaster central controller 235 uses a unicast conversion module 275 to convert each of the multicasts to a unicast format. In various embodiments, a proactive FEC module 280 (see Section 2.5) generates and adds forward error correction packets to one or more of the unicasts prior to transmission to corresponding target clients via the communications module 230 and the corresponding access points 220.

As noted above, clients 200 are either designated as a "target client" for a particular unicast, or they listen to that unicast in promiscuous mode. Further, also as noted above, each client is given a copy of the session keys of each other clients' virtual multicast interfaces (depending upon which multicast groups those clients are subscribed to). As such, all clients are capable of decoding any unicast they receive so long as they are "subscribed" to the corresponding multicast. In general, given the shared session keys, each client 200 uses those keys to decode received unicasts via a unicast decode module 285 that also converts the decoded unicast back into a multicast format prior to playback. Note that in various embodiments, the unicast decode module 285 may also use one or more received FEC packets to correct for unicast packet losses (if any). The decoded multicast is then provided to a multicast playback module 290 for playback on one or more conventional output devices (e.g., display devices, speakers, etc.).

Finally, as noted above, in various embodiments, assignment control, destination control and FEC amounts are dependent upon the dynamic wireless networking environment in which the clients 200 are in communication with the access points 220. Consequently, in various embodiments, a client feedback module 295 provides various feedback information (e.g., packet loss rates, received signal strength (RSSI), joining or leaving multicasts, etc), to the Wi-Fi Multicaster central controller 235. As discussed in further detail in Section 2.6, the feedback information provided by each client is used to dynamically and/or periodically update client AP assignments (via the association control module 245). In various embodiments, this feedback information is also used to periodically update which clients are identified as target clients at one or more APs. Further, in various embodiments, this client feedback is also used to control the amount of FEC that is added to the multicast based on packet loss rates (and/or signal strength between clients and APs) reported by one or more clients.

2.0 Operational Details of the Wi-Fi Multicaster:

The above-described program modules are employed for implementing various embodiments of the Wi-Fi Multicaster. As summarized above, the Wi-Fi Multicaster provides various techniques for enabling efficient and reliable multicasting in a Wi-Fi network. The following sections provide a detailed discussion of the operation of various embodiments of the Wi-Fi Multicaster, and of exemplary methods for implementing the program modules described in Section 1 with respect to FIG. 1 and FIG. 2. In particular, the following sections provide examples and operational details of various embodiments of the Wi-Fi Multicaster, including: Wi-Fi Multicaster system definitions and considerations; an operational overview of the Wi-Fi Multicaster; "destination control" operations for selecting target clients at each AP; "association control" operations for grouping clients into multicast groups and assigning clients to particular APs for minimizing airtime; optional proactive FEC; client feedback to the Wi-Fi Multicaster "central controller"; a virtual multicast interface for clients; and an alternate implementation of the Wi-Fi Multicaster that includes extensions to the 802.11 standard.

2.1 Wi-Fi Multicaster System Definitions and Considerations:

The following discussion makes use of a number of terms that are formally defined below. In particular, it is important to distinguish between the terms "application data rate" and the "data rate" of wireless links as used through this document. Specifically, the term "data rate" is used whenever referring to the application data rate, while the term "transmission rate" is used whenever referring to the data rate of wireless links (e.g., rate between APs and clients). In general, the data rate depends on the application, and can take any arbitrary value, while the transmission rate depends on the wireless technology, and can take only certain fixed values (e.g., 6 Mbps, 12 Mbps, etc., for 802.11a).

One advantageous feature of the Wi-Fi Multicaster is that APs in the Wi-Fi use conventional 802.11-based hardware (currently widely deployed in most Wi-Fi networks worldwide), though non-standard modifications to this hardware can be implemented if desired (see Section 2.8 for a discussion of extensions to the 802.11 standard). The ability of the Wi-Fi Multicaster to use conventional access points enables easy deployment within large Wi-Fi Networks as well as cost-effectiveness since no hardware in the Wi-Fi Network needs to be replaced to implement the Wi-Fi Multicaster.

Another advantageous feature of the Wi-Fi Multicaster is that legacy Wi-Fi clients (without the "client proxy" software component of the Wi-Fi Multicaster) may continue to operate within the Wi-Fi network without control or interference by the Wi-Fi Multicaster or other clients that do use the "client proxy" software.

In addition to the above considerations, it should be understood that, as with AP transmission schemes in any Wi-Fi network having multiple overlapping AP zones, performance of the Wi-Fi Multicaster is improved if neighboring APs in the Wi-Fi network operate on different channels. Consequently, for purposes of explanation, the remainder of the discussion of the Wi-Fi Multicaster will assume that AP's in the Wi-Fi network operate on different channels. However, it should be understood that the "different channel" assumption may be relaxed by performing admission control and load balancing on multicast traffic.

Another assumption that is made in the following discussion, for purposes of ease of explanation, is that the multicast traffic does not exceed available AP capacity. However, it should be understood that this assumption can be relaxed by making minor changes to the "client proxy" software.

With respect to clients in the Wi-Fi Network, as noted above, clients that do not wish to participate in the multicasting features offered by the Wi-Fi Multicaster do not need to be modified or adjusted in any way. In fact, the use of the Wi-Fi Multicaster will be transparent to such clients. On the other hand, clients that wish to participate in the Wi-Fi Multicaster multicast sessions must run client proxy software component of the Wi-Fi Multicaster. Further, these clients must also support promiscuous mode operations (enabled by most conventional 802.11-based hardware). Finally, for the client to act as a "target client", that client must also include a wireless interface that can be instructed to associate with a specific AP (again this feature is enabled by most conventional 802.11-based hardware).

2.2 Operational Overview:

As noted above, the Wi-Fi Multicaster-based processes described herein provide various techniques for enabling efficient and reliable multicasting in a Wi-Fi network. In general, the Wi-Fi Multicaster architecture consists of a client component and a server component.

The client component of the Wi-Fi Multicaster is a collection of software modules (see FIG. 2 and associated discussion) jointly forming the aforementioned "client proxy" software that runs on all clients that wish to receive multicast traffic. These clients are referred to herein as "Wi-Fi Multicaster clients" or simply "clients". Note however, that for purposes of explanation, specific reference may be made to particular clients within the overall Wi-Fi network that are not involved in communications with the Wi-Fi Multicaster. Note also that any client, whether or not it is involved in communications with the Wi-Fi Multicaster, may simultaneously be involved with other conventional communications operations within the Wi-Fi network. A simple example of such parallel or simultaneous communications might be that a particular client is subscribed to one or more multicasts via the Wi-Fi Multicaster, while simultaneously "surfing" the Internet, sending email, and accessing one or more files on a local server connected to the Wi-Fi network.

The server component, referred to as the "central controller" component of the Wi-Fi Multicaster is a separate component from both the APs and any multicast servers (though the central controller can also act as a multicast server, as noted above). Note that for the purpose of explanation, it is assumed that there is only one the Wi-Fi Multicaster central controller per enterprise or Wi-Fi network. However, it should be clear that in the same manner as multiple multicast servers may be included in any particular Wi-Fi network, multiple central controller components of the Wi-Fi Multicaster may also be included in the Wi-Fi network.

In general, the basic operation of the Wi-Fi Multicaster system can be summarized as follows. First, the client proxy software component running on each client intercepts requests to join and/or leave an IP multicast group, and sends the request to the Wi-Fi Multicaster central controller via an associated AP. The Wi-Fi Multicaster central controller subscribes to the multicast group on the client's behalf, unless it has already subscribed to it on behalf of some other client. The central controller maintains the membership in the multicast group as long as at least one client in the system is subscribed to it.

When a multicast packet is received by the Wi-Fi Multicaster central controller (intercepted from a conventional multicast server), it prepares a list of all clients that have subscribed to that multicast group, and groups them according to the APs they are associated with. For each AP, the Wi-Fi Multicaster central controller then selects a particular client as the "target client", and unicasts the multicast packet to that client. The target client at each AP is generally the client that has the worst connectivity (i.e., the weakest link) to that AP. Other clients associated with that AP receive the packet by monitoring the channel in a promiscuous mode.

However, since the non-target clients listen to packets in promiscuous mode, there is no guarantee that every non-target client will receive all of the packets. Therefore, in various embodiments, the Wi-Fi Multicaster central controller overcomes such packet loses by also sending proactive FEC packets to the clients via the APs. These FEC packets allow non-target clients to recover any data they have missed. The Wi-Fi Multicaster central controller periodically evaluates local conditions (such as packet loss rates by the target client) to determine whether it is necessary to change the amount of FEC packets that sends. Note that since the target client is the client with the weakest link, it can reasonably be assumed that the target client will suffer the highest packet loss rate. Consequently, providing sufficient FEC packets for the target client is expected to provide more than adequate FEC packets for the rest of the clients listening in promiscuous mode.

Further, the Wi-Fi Multicaster central controller periodically re-evaluates whether it needs to change the target client (destination control) at each AP and/or whether it needs to reassign clients among APs (association control) since particular clients may be in range of multiple APs. In various embodiments, this re-evaluation is also carried out when clients join or leave multicast groups.

For example, FIG. 1, also discussed above, illustrates the Wi-Fi Multicaster implemented within an exemplary system. This system includes a single "central controller" 100 disposed between a set of M conventional multicast servers (105, 110, 115) and a set of N conventional APs (120, 125, 130), though as discussed in Section 2.8, the AP may include modifications or extensions to the 802.11 standard.

In this simple example system, each of the APs (120, 125, 130) includes one or more associated clients (e.g., mobile devices 135 through 165). Further, participating clients (e.g., mobile devices 135 through 160) are clustered into one or more "multicast groups" (e.g., $G_1$ and/or $G_2$). For example, clients $C_{11}$, $C_{12}$, and $C_{13}$ (i.e., mobile devices 135, 140 and 145) form multicast group $G_1$, as illustrated. Since client $C_{13}$ (145) in $G_1$ is more distant (i.e., the weakest link) to the corresponding $AP_1$ (120) than is client $C_{11}$ (135) or client $C_{12}$ (140), the Wi-Fi Multicaster central controller identifies client $C_{13}$ as the "target client" for $AP_1$ with regard to multicast group $G_1$. Client $C_{13}$ (145) then receives the multicast as a unicast, while Clients $C_{11}$ (135) and $C_{12}$ (140) both receive the unicast packets sent to Client $C_{13}$ in promiscuous mode.

Similarly, clients $C_{21}$, $C_{22}$, and $C_{31}$ (i.e., mobile devices 150, 155 and 160) form multicast group $G_2$, as illustrated. In this case, clients $C_{21}$ and $C_{22}$ (i.e., mobile devices 150 and 155) are associated with $AP_2$, while client $C_{31}$ (160) is associated with $AP_N$ (130). In this case, since each AP has as associated target client, both client $C_{22}$ (155) and client, $C_{31}$ (160) are target clients even though both of these clients are in the same multicast group. Note that in this simple example, client $C_{31}$ (160) is also a member of multicast group $G_3$ (in addition to being a member of multicast group $G_2$) since any client may subscribe to multiple multicasts. However, as discussed in Section 2.4.1, once a client is assigned to a particular AP, that AP will host all multicast groups to which that client has subscribed (unless that client is capable of multiple simultaneous associations). Finally, note that mobile device 165 in FIG. 1 represents a client within the Wi-Fi network that is not participating in any of the Wi-Fi multicasts.

2.3 Destination Control:

For the purpose of the following discussion, it is assumed that the Wi-Fi Multicaster central controller is provided with all necessary information about the APs and multicast clients in the system, as well as the condition of channels between them. Note that a description of how this information is reported to the Wi-Fi Multicaster central controller is provided in Section 2.6 with respect to "client feedback".

As described above, the Wi-Fi Multicaster sends multicast packets as unicast packets to a target client at each AP. All the other clients at that AP "listen" to that data in promiscuous mode. One challenge in this approach is to select the right target client at each AP (i.e., "destination control"). Since the packets are sent as a unicast to the target client, the transmission rate is determined by the conventional autorate algorithm on the AP, and the condition of the wireless channel between the AP and the target client. For example, the transmission rates for 802.11a-based transmissions include 6 Mbps, 9 Mbps, 12 Mbps, 18 Mbbs, 24 Mbps, etc.

If the client selected as the target client has good channel conditions, the autorate algorithm on the AP will send the packets at a higher transmission rate. Clearly, the use of higher transmission rates will reduce the consumption of airtime at the AP. However, by increasing the transmission rate too much, if any of the other clients who are listening in promiscuous mode have worse channel conditions (even temporarily), those clients may not be able to fully decode the multicast due to packet losses.

Thus, the Wi-Fi Multicaster selects the "worst" client at each AP as the target client. As defined herein, the worst client is the one to which the AP will send with the least transmission rate. Note that Section 2.6 provides a discussion of how the central controller component of the Wi-Fi Multicaster determines what unicast transmission rate the AP uses for each target client. In a tested embodiment, this choice is re-evaluated every 30 seconds to account for changing environmental or channel conditions and/or physical movement of one or more clients. However, it should be appreciated that the re-evaluation can be performed at any desired interval or in response to changing conditions such as association of new clients or changing packet loss conditions. In fact, in various embodiments, whenever a new client arrives at an AP (i.e., the new client is associated with that AP) the central controller re-evaluates the choice of the target client for that AP. In related embodiments, the central controller re-evaluates the choice of the target client for that AP whenever the loss rate at any client exceeds some predetermined threshold level (e.g., 10% packet loss, but can be set to any desired level). Note that in various embodiments, any client, whether or not it is the target client, is permitted to periodically report loss rates so that the central controller may adjust transmission rates and/or the amount proactive FEC packets being transmitted.

Using the approach of destination control described above, it is clear that it is essentially the worst client (i.e., the client having the least transmission-rate) belonging to an AP client group that determines the impact this group will have on overall airtime consumption and thus, how it will affect other contending wireless traffic (i.e., traffic not related to the Wi-Fi Multicaster). For this reason, associating clients and multicast sessions to APs becomes a non-trivial optimization problem, referred to herein as "association control", which is discussed in detail in Section 2.4.

2.4 Association Control:

In general, "association control" is treated as an optimization problem for minimizing the airtime consumed by multicast sessions managed by the Wi-Fi Multicaster. For example, if client A is likely to get 24 Mbps at $AP_1$, and 12 Mbps at $AP_2$, it makes sense for client A to associate with $AP_1$. However, if $AP_1$ has no other clients associated with it, and $AP_2$ already has a multicast client associated with it for the same multicast session, and is receiving data at a rate of 12 Mbps or less, it makes sense to associate client A with $AP_2$, as no additional airtime would be consumed.

As noted above, in various embodiments, the Wi-Fi Multicaster re-evaluates client and multicast assignments every 30 seconds (or any other desired period), whenever a new client arrives (or a target client leaves), or when a predetermined loss threshold is exceeded. After determining the appropriate mappings (i.e., client to AP mappings) for reducing or minimizing airtime, the central controller component of the Wi-Fi Multicaster directs the clients to change their current AP associations, if necessary, to match the mappings determined by the central controller. This is accomplished by sending the "Basic Service Set Identifier" (BSSID) of the appropriate AP to the Wi-Fi Multicaster client, which then makes appropriate calls to the wireless driver software on the client to enforce the choice. Note that client association to a particular AP based on the BSSID of the AP is well known to those skilled in the art, and will not be described herein.

The actual optimization problem definition is given below, along with an example of a tested embodiment of an association control algorithm used by the Wi-Fi Multicaster. However, it should be understood that as with any optimization problem, there are typically many ways to identify "solutions" to the problem. As such, it should be understood that any desired algorithm or solution for reducing or minimizing the consumption of airtime by APs may be used by the Wi-Fi Multicaster without departing from the scope of the ideas presented herein.

2.4.1 Formal Definition of Optimization Problem:

If every client can be a member of multiple multicast groups, the question of how to assign clients to APs becomes an interesting and difficult combinatorial optimization problem. Intuitively, the difficulty stems from the fact that once a client is assigned to a particular AP, this AP will generally host all multicast groups to which that client has subscribed. Note that one exception to this rule is the case where a client is capable of multiple simultaneous associations to different APs. In this case, each unique association will be treated as originating from a unique client for purposes of association control (thus, such a client might be associated with multiple different APs). Note also that different clients subscribed to the same multicast group are not necessarily associated with the same AP (as illustrated with respect to FIG. 1). Some of these multicast groups may be well-suited to be hosted on a particular AP (in the sense that other clients belonging to these groups are already associated with this AP), but others may not. The challenge is to appropriately disentangle these dependencies and find a good partitioning of clients to APs, such that all (or at least most) clients are assigned to good APs. Further, given the above-described destination control procedure, it is the client with least transmission rate to the AP that determines this AP's airtime utilization for its multicast groups.

Problem Definition: Formally, the multicast client association control problem can be modeled as follows: Given a set of n clients $\mathcal{C} = \{C_1, \ldots, C_n\}$, m APs $\mathcal{AP} = \{AP_1, \ldots, AP_m\}$ and g multicast groups $\mathcal{M} = \{M_1, \ldots, M_g\}$, every multicast group consists of a subset of the clients, i.e., $M_k \subset \mathcal{C}$ for all $1 \leq k \leq g$. Notice that individual clients can be a member of multiple multicast groups, but that clients are associated with only one AP. The set of multicast groups that a client $C_i$ is interested in is denoted by $T_i$, i.e., $T_i = \{M_k \in \mathcal{M} \mid C_i \in M_k\}$. Further, let $R_{ij}$ be the transmission rate client $C_i$ achieves when associating to $AP_j$. The basic idea is then to assign clients and multicast groups to APs such that:

1) Every client is associated to exactly one AP; and
2) If a client $C_i$ is associated to $AP_j$, then all multicast groups in $T_i$ (i.e., the complete set of multicast groups to which client $C_i$ is interested in) must be assigned to $AP_j$. However, note that other APs may also host the same multicast as another AP for one or more different clients.

For every multicast group that is assigned to an AP, its airtime is determined by the least transmission rate of all clients in this multicast group that are associated to this AP. Formally, the airtime $a_{jk}$ of multicast group $M_k$ on $AP_j$ is defined as $$a_{jk} = \max_{C_i \in C^j} \frac{1}{R_{ij}},$$

where $C^j$ is the set of clients associated to $AP_j$. Note that if no client in a group $M_k$ is assigned to $AP_j$, then $a_{jk} = 0$. Finally, since it is desired to minimize the overall airtime across all APs, a solution to the optimization problem seeks to minimize the quantity: $AT = \Sigma_{AP_j \in \mathcal{AP}} \Sigma_{M_k \in \mathcal{M}} a_{jk}$, as discussed in further detail below.

ILP Formulation: In a tested embodiment of the Wi-Fi Multicaster, the above-described optimization problem is formulated as a (mixed) Integer Linear Program (ILP). For example, let $x_{ij}$ be an indicator variable that is 1 if $C_i$ is assigned to $AP_j$, and 0 otherwise, as illustrated below, where:

$$\min AT = \sum_{AP_j \in \mathcal{AP}} \sum_{M_k \in \mathcal{M}} a_{jk}$$

-continued $$\text{s.t.} \sum_{AP_j \in \mathcal{AP}} x_{ij} = 1, \forall\, C_i \in \mathcal{C}$$

$$a_{jk} \geq \frac{1}{R_{ij}} \cdot x_{ij}, \forall\, AP_j \in \mathcal{AP}, C_i \in M_k$$

$$a_{jk} \geq 0, \forall\, AP_j \in \mathcal{AP}, M_k \in \mathcal{M}$$

$$x_{ij} \in \{0, 1\}, \forall\, C_i \in \mathcal{C}, AP_j \in \mathcal{AP}.$$

The above ILP computes an optimal client association. However, one disadvantage problem with this ILP is that its number of constraints is $2^M$, which can be exponential if $g \in \omega(\log n + \log m)$, and thus, it is generally unclear how to solve it efficiently or appropriately relax it to an efficiently solvable LP. Therefore, in another embodiment of the Wi-Fi Multicaster a "greedy" heuristic, as discussed in Section 2.4.2, is used to solve the optimization problem.

2.4.2 Greedy Algorithm for Aptimization of Association Control:

If all clients belong to exactly one multicast group, a variant of the multicast group association control problem can be reduced to an instance of a conventional set cover problem. Interestingly, the more complex problem in which every client can be in multiple multicast groups, as enabled by the Wi-Fi Multicaster, can also be reduced to a known problem, albeit with a different transformation, as long as the number of multicast groups is within reasonable bounds. In general, the heuristic described below is a 4 log n approximation algorithm for the problem, i.e., its solution is guaranteed to be within at most a logarithmic factor of theoretical optimum that is asymptotically optimal.

In particular, given an instance I of the client association problem, a set S is defined as consisting of sets $S_{G,j,\kappa}$, where $G \subset 2^{\mathcal{M}}$ denotes a set of multicast groups, j denotes $AP_j$, and $\kappa$ is the maximum airtime that is allowed. Intuitively, the set $S_{G,j,\kappa}$ contains all clients for which the transmission rate is sufficiently high ($1/R_{ij} \leq \kappa$), and that, if all multicast groups in G are assigned to $AP_j$, can associate to $AP_j$. Formally, $S_{G,j,\kappa}$ and S are defined as follows:

$$S_{G,j,\kappa} := \left\{ C_i \in \mathcal{C} \,\middle|\, T_i \subseteq G \bigwedge \frac{1}{R_{ij}} \leq \kappa \right\}$$

$$\mathcal{S} := \{ S_{G,j,\kappa} \mid G \subseteq 2^{\mathcal{M}}, AP_j \in \mathcal{AP}, \exists\, R_{ij} \text{ s.t. } R_{ij}^{-1} = \kappa \}.$$

Note that the cardinality of $\mathcal{S}$ is at most $|\mathcal{S}| \leq 2^{|\mathcal{M}|} \cdot |\mathcal{AP}| \cdot |\mathcal{C}|$ because the number of different transmission rates $R_{ij}$ and hence $\kappa$ is at most $|\mathcal{C}|$.

For each set $S_{G,j,\kappa}$ its "cost" is defined as:

$$\text{cost}(S_{G,j,\kappa}) = \sum_{\substack{M_k \in G \\ R_{ij}^{-1} \leq \kappa}} \max_{\substack{C_i \in M_k}} R_{ij}^{-1}.$$

where the cost of $S_{G,j,\kappa}$ indicates how much adding this set (i.e., the corresponding multicast groups) costs in terms of additional airtime.

Consequently, a solution to the optimization problem can be achieved by applying the following "greedy" approximation algorithm for association control:

| "Greedy Algorithm" for Association Control |
|---|
| (1) Round up all $R_{ij}$ to the next power of two. ($\rightarrow \hat{R}_{ij}$); <br> (2) $U := \mathcal{C}$; $S^* := \{\ \}$; <br> (3) while $|U| > 0$ do <br>    a. Compute cf $(S_{G,j,\kappa}) = \frac{|U \cap S_{G,j,\kappa}|}{\text{cost}(S_{G,j,\kappa})}, \forall\, S_{G,j,\kappa} \in \mathcal{S}$. <br>    b. Let S' be the set with maximum cf $(S_{G,j,\kappa})$. <br>    c. $U := U \setminus S'$; $S^* := S^* \cup \{S'\}$; <br> (4) end while |

In general, the Greedy Algorithm described above first rounds up all transmission rates $R_{ij}$ to the next higher power of two, and it then uses these rounded values $\hat{R}_{ij}$ throughout the remainder of the algorithm. It then proceeds in a manner similar to the greedy set cover algorithm in that in every iteration, it chooses the set that has maximum cost-efficiency $\text{cf}(S_{G,j,\kappa})$.

It is interesting to note that the worst-case bound on the performance of the greedy heuristic described above can be proven to be a factor of 4 log n of the optimum solution. In general, the time complexity can easily be seen by observing that the only computationally intensive operation is the computation of cf $(S_{G,j,\kappa})$ for all $S_{G,j,\kappa} \in \mathcal{S}$, because this takes time $|\mathcal{S}|$ which can be as large as $2^g$. However, for any $g \in O(\log n + \log m)$, the time complexity is polynomial. As for the approximation, it can be shown that the set-cover problem over the sets S forms an upper bound on the problem. As a result, the following theorem can be presented:

Theorem 1: For $g \leq C(\log n + \log m)$, the above-described "Greedy Algorithm" computes, in polynomial time, a solution to the client association problem that is within a factor of 4 log n of the optimum solution. This is asymptotically optimal.

Again, as noted above it should be understood that the optimization solution provided above is provided for purposes of explanation, and that any desired algorithm or solution for reducing or minimizing the consumption of airtime by APs may be used by the Wi-Fi Multicaster without departing from the scope of the ideas presented herein.

2.5 Proactive FEC:

Since non-target clients receive packets by listening in promiscuous mode, they may not receive all the packets (i.e., theses clients are not sending ACKs or NAKs to the AP. In various embodiments, the Wi-Fi Multicaster central controller addresses these potential losses by adding FEC packets to the data stream being transmitted to the target client. While any desired FEC scheme can be used, in a tested embodiment, the Wi-Fi Multicaster uses well-known Reed-Solomon codes to construct parity packets from a block of recent packets, using typical block sizes of 16 or 32 packets. Since wireless losses at different clients are typically uncorrelated, as is well-known to those skilled in the art, Reed-Solomon codes allow the transmission of an optimal amount of parity packets in order for all clients to recover from their losses. While Reed-Solomon codes are computationally expensive, it should be understood that the use of Reed-Solomon codes is provided only for purposes of explanation in describing the ability of the Wi-Fi Multicaster to adapt to variations in wireless channel conditions and mobility. Clearly, it would be a simple matter to replace the Reed-Solomon encoder with any other desired code, such as, for example, Tornado codes, that allow for better trade-off between efficiency and computational overhead.

The Wi-Fi Multicaster central controller has to estimate the current level of packet losses seen by the clients subscribed to the multicast group at a particular AP, and proactively send the requisite amount of parity packets in order to reduce latency in loss recovery. The amount of parity packets sent is determined by the losses seen by the clients for previous blocks. While such losses can be determined or estimated using a variety of techniques, in a tested embodiment of the Wi-Fi Multicaster, a multiplicative increase multiplicative decrease (MIMD)-based algorithm, as described below, was used for computing the number of parity packets. The rationale behind the choice of an MIMD algorithm is that it has been observed that in tested embodiments of the Wi-Fi Multicaster, packet losses generally exhibited spike-like characteristics. Part of the reason for this is specific to the Wi-Fi Multicaster since the AP is performing rate adaptation with respect to one of the clients while losses at the clients in promiscuous mode can vary significantly. Thus, the MIMD algorithm helps the Wi-Fi Multicaster react quickly to both sudden increases in losses as well as sudden decreases in losses.

| MIMD-Based Proactive Coding Algorithm |
| --- |
| (1) if (insufficient parity) /* loss */<br>   a. if (Parity*2 > loss) Parity = loss<br>   b. else Parity = Parity *2;<br>(2) if (excessive parity)<br>   a. if (Parity/2 < (Parity − gain)) Parity −= gain<br>   b. else Parity = Parity / 2; |

2.6 Client Feedback:

In the preceding discussion, it was assumed that the Wi-Fi Multicaster central controller has full knowledge of the network. In practice, it needs to know the following items for each client:

(1) The AP the client is associated with;
(2) The loss rate the client is currently experiencing for the multicast traffic; and
(3) The unicast transmission rate a client may get at an AP.

The Wi-Fi Multicaster central controller derives this information from periodic feedback sent by the clients. This feedback information includes:

(1) The event that triggered the feedback;
(2) The AP the client is associated with;
(3) Loss rate of multicast packets. Note that this feedback is given on a per-group basis if the client is associated with multiple multicast groups.
(4) Average RSSI of packets received from the AP the client is associated with; and
(5) RSSI of beacons heard from other nearby access points In general, the loss rate of the multicast packets is computed as a running average over some any desired preset period. For example, in a tested embodiment, a period of 5 seconds was used. The average RSSI of the packets received from the AP is computed in a similar manner. In particular, to gather RSSI of beacons heard from nearby APs, the Wi-Fi Multicaster central controller relies on the fact that most modern Wi-Fi cards automatically perform periodic background scans to gather this information. The feedback is sent back to the Wi-Fi Multicaster central controller as a normal unicast packet.

The Wi-Fi Multicaster central controller uses the loss rate information directly. Estimating the transmission rate a client is likely to get at various APs is more difficult. While there are a large number of transmission rate estimation approaches that can be used without departing from the scope of the ideas presented herein, in a tested embodiment of the Wi-Fi Multicaster, signal strength information is converted into estimates of transmission rates using a conventional estimation technique referred to as "RateMap". This technique relies on a profile generated from historical data to correlate signal strength with transmission rates. It is essentially a way to reverse-engineer the autorate algorithm on the AP, with only signal strength information. While the results of the RateMap approach is not fully accurate, the transmission rate estimates are sufficiently close to allow the Wi-Fi Multicaster central controller to perform the client assignment functions described herein.

In various embodiments, feedback from the clients is generally triggered by a periodic timer. However, if at any time, the loss rate exceeds the aforementioned predetermined threshold (set to 10% in a tested embodiment), the client sends a feedback report immediately. Note that this feedback mechanism also helps detect whether the target client has left the network. For example, imagine a scenario in which the target client simply shuts down or walks away, without first leaving the multicast group. In this case, there are two possibilities. First, if the client formally dissociates with the AP, the AP will simply stop forwarding the unicast stream to that client immediately. However, even if the client does not disassociate, the AP will generally stop forwarding traffic using some internal timeout. Either way, the stream of unicast packets will stop, and this will result in 100% loss rate for all other clients associated with that AP. These other clients will then immediately trigger a feedback (assuming a 10 percent loss threshold), and the Wi-Fi Multicaster central controller will pick another client to be the target client.

2.7 Virtual Multicast Interface:

Recall that non-target clients receive packets by listening to them in promiscuous mode. Multicast security in IEEE 802.11 is performed using a separate global encryption key. This key is known to all devices in the network and is different from the client's unicast key. The sender encrypts multicast packets using the global key, which is then decrypted at each node that is part of the multicast group. It is challenging to achieve the same level of security in the Wi-Fi Multicaster. For example, if the APs encrypt packets with the destination client's unicast key, other clients in the multicast group will be unable to decode the packets. Unfortunately, simple solutions such as revealing the unicast key of the target client to the other clients will compromise security. Further, adding logic to the AP such that it uses non-unicast keys for the Wi-Fi Multicaster packets would require modifications to the AP. Consequently, while either of these solutions is possible, neither is preferred.

However, in various embodiments, the Wi-Fi Multicaster achieves the functionality of a global multicast key by creating a "Virtual Wi-Fi" interface at the client for each multicast group that the client is subscribed to. Each virtual interface has a separate MAC address and hence appears to the AP as a separate wireless card. Multicast traffic at the client for each multicast group is routed through the respective virtual multicast interface, while regular unicast traffic is sent over its own distinct virtual interface. Every client shares the security session keys for each of its virtual multicast interfaces with the Wi-Fi Multicaster central controller, which then multicasts the keys to the clients of each of the respective multicast groups. The other clients then use the received keys to decode their multicast group's packets that they receive (as unicast) in promiscuous mode. In this manner, each multicast group is allowed to have distinct encryption keys that are also separate from the unicast encryption keys of each client.

Note that this technique does not suffer from switching overhead since all the virtual interfaces are associated to the same AP and thus operate on the same Wi-Fi channel. Furthermore, most commercial Wi-Fi cards allow the card to send ACKs for multiple MAC addresses. More importantly, this technique enables multicast security for the Wi-Fi Multicaster without modifying the APs in any way.

2.8 Alternate Implementation of the Wi-Fi Multicaster:

In a related embodiment of the Wi-Fi Multicaster, the problem of multicasting over the Wi-Fi network is address in a somewhat different manner than that described above. In particular, in this related embodiment, the Wi-Fi Multicaster performs a unicast transmission to the weakest client (i.e., the "target client"), as described above. However, in contrast to the processes summarized above, in this related embodiment, all the clients have a virtual interface that has the same virtual MAC address to handle the multicast transmission. This will ensure that every client will have the same secret key for encryption and decryption, eliminating the key sharing problem. In this case, one further modification to the Wi-Fi Multicaster is that the client side software (i.e., the "client proxy" software component of the Wi-Fi Multicaster) is designed such that only one of the clients (which all share the same MAC address via the virtual interface) sends an acknowledgement. This client is the same client that the unicast was intended for (i.e., the "target client") by the AP.

More specifically, one of the problems with 802.11 multicast is the lack of MAC-level acknowledgements from the multicast clients to the access point (AP). On the other hand, since a multicast packet can be targeted to several clients, allowing each client to acknowledge the reception of a multicast packet can lead to high complexity in MAC protocol design since the multiple acknowledgements need to be coordinated with respect to each other.

Therefore, in the embodiment described above, the 802.11 multicast standard is extended so that exactly one client is given the responsibility of sending back acknowledgements to the multicast packet. This client can be identified by the AP by simply adding its MAC address as one of the additional MAC addresses in the 802.11 header. Thus, on a frame-by-frame basis, the AP can choose to receive acknowledgements from any one of the clients of the multicast group.

Given this change or extension to the IEEE 802.11 standards, the AP or a network-proxy could then use the Wi-Fi Multicaster techniques described above to identify the "target client" (e.g., the client with the worst signal), receive acknowledgements from that client and thereby perform rate-adaptation to deliver the highest achievable rate for that client. One key advantage of this modification to the 802.11 standards over the basic Wi-Fi Multicaster approach described in Section 2.7 (which requires no modifications to the 802.11 standards) is that this approach allows standard 802.11 group-key based encryption mechanisms to work unchanged.

Further, it is also important to understand that the embodiment described above requiring an extension to the 802.11 standard is interoperable with embodiments of the Wi-Fi Multicaster that do not require extensions or modifications to the 802.11 standard. Consequently, it should be clear that APs in Wi-Fi network in which the Wi-Fi Multicaster is used without extensions or modifications to the 802.11 standard can be upgraded over time to include one or more APs that do make use of the extensions or modifications to the 802.11 standard described above. Further, clients in that Wi-Fi network would be able to interact with APs whether or not those APs included the extensions or modifications to the 802.11 standard. Note however that for the purpose of receiving multicasts as described above, clients including modified 802.11 based hardware would still need to use the above-described "client proxy" software in order to interact with the Wi-Fi Multicaster central controller via their respective APs, as described above.

Figure 3:
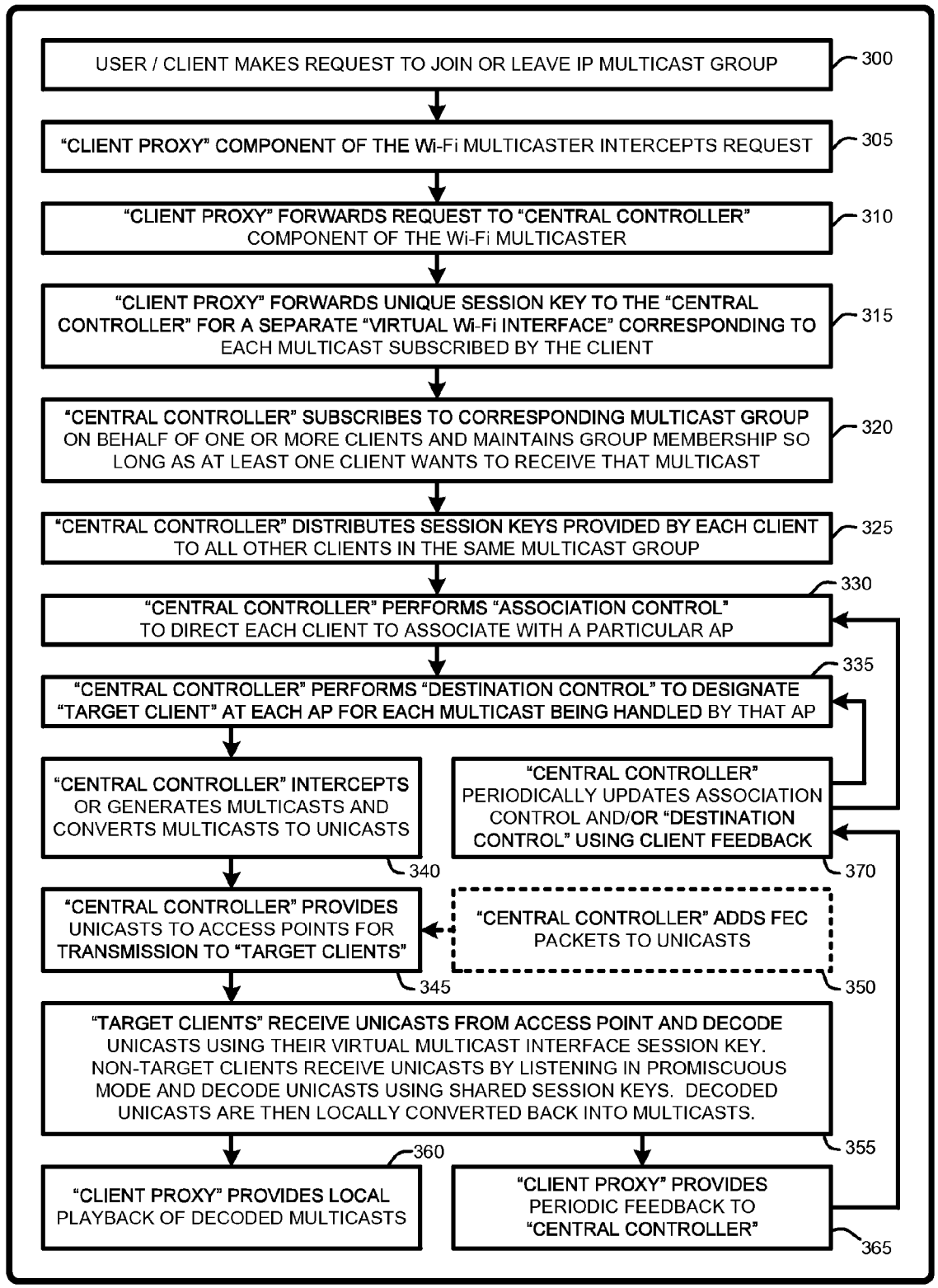
FIG. 3 is a general system flow diagram that illustrates an overview of the operation of the overall Wi-Fi Multicaster within a Wi-Fi network, as described herein.

3.0 Operational Summary of the Wi-Fi Multicaster:

The processes described above with respect to FIG. 1 and FIG. 2 and in further view of the detailed description provided above in Sections 1 and 2 are illustrated by the general operational flow diagram of FIG. 3. In particular, FIG. 3 provides an exemplary operational flow diagram that provides a high-level summary of the operation of some of the various embodiments of the overall Wi-Fi Multicaster. Note that FIG. 3 is not intended to be an exhaustive representation of all of the various embodiments of the Wi-Fi Multicaster described herein, and that the embodiments represented in FIG. 3 are provided only for purposes of explanation.

Further, it should be noted that any boxes and interconnections between boxes that are represented by broken or dashed lines in FIG. 3 represent optional or alternate embodiments of the Wi-Fi Multicaster described herein, and that any or all of these optional or alternate embodiments, as described below, may be used in combination with other alternate embodiments that are described throughout this document.

In general, as illustrated by FIG. 3, operation of the overall Wi-Fi Multicaster begins operation when the user or individual client makes a request 300 to join (or leave) a particular IP multicast group. The "client proxy" component of the Wi-Fi Multicaster intercepts 305 all such requests and forwards 310 the intercepted requests to the "central controller" component of the Wi-Fi Multicaster. In addition, the "client proxy" also forwards 315 a unique session key to the "central controller" for a separate "virtual Wi-Fi interface" corresponding to each unique multicast subscribed to by the client.

In response to the multicast requests forwarded 310 by the "client proxy", the "central controller" subscribes 320 to corresponding multicast groups on behalf of one or more clients. Note that the "central controller" maintains group membership in a particular multicast so long as at least one client is still receiving that multicast. In addition, the "central controller" distributes 325 the session keys provided by each client to all other clients in the same multicast group.

The "central controller" also performs "association control" 325 to direct each client to associate with a particular AP. Further, the "central controller" performs "destination control" 335 to designate a "target client" at each AP for each multicast being handled by that AP. Again, as described above, the use of association and destination control operations allows the Wi-Fi Multicaster to reduce or minimize the airtime consumed at each AP.

Given this configuration of clients and AP, the "central controller" then acts 340 to intercept, or locally generate, multicasts and convert those multicasts to unicasts. The "central controller" then provides 345 these unicasts to the various APs points for transmission to target clients associated with those APs. Further, in various embodiments, the "central controller" adds 350 FEC packets to unicasts prior to providing 345 the unicasts to the APs for transmission to the target clients.

Target clients then receive unicasts from their associated AP, and act 355 to decode those unicasts using their corresponding virtual multicast interface session key. In contrast, non-target clients receive unicasts by listening in promiscuous mode and acting 355 to decode those unicasts using a corresponding one of the shared session keys distributed by the "central controller". Once a unicast has been decoded on any client (and converted back to a multicast format), the local "client proxy" provides local playback 360 of the decoded multicasts.

Finally, in various embodiments, the "client proxy" provides periodic feedback 365 to the "central controller". The "central controller" then uses this client feedback information to periodically update 370 "association control" and/or "destination control".

Figure 4:
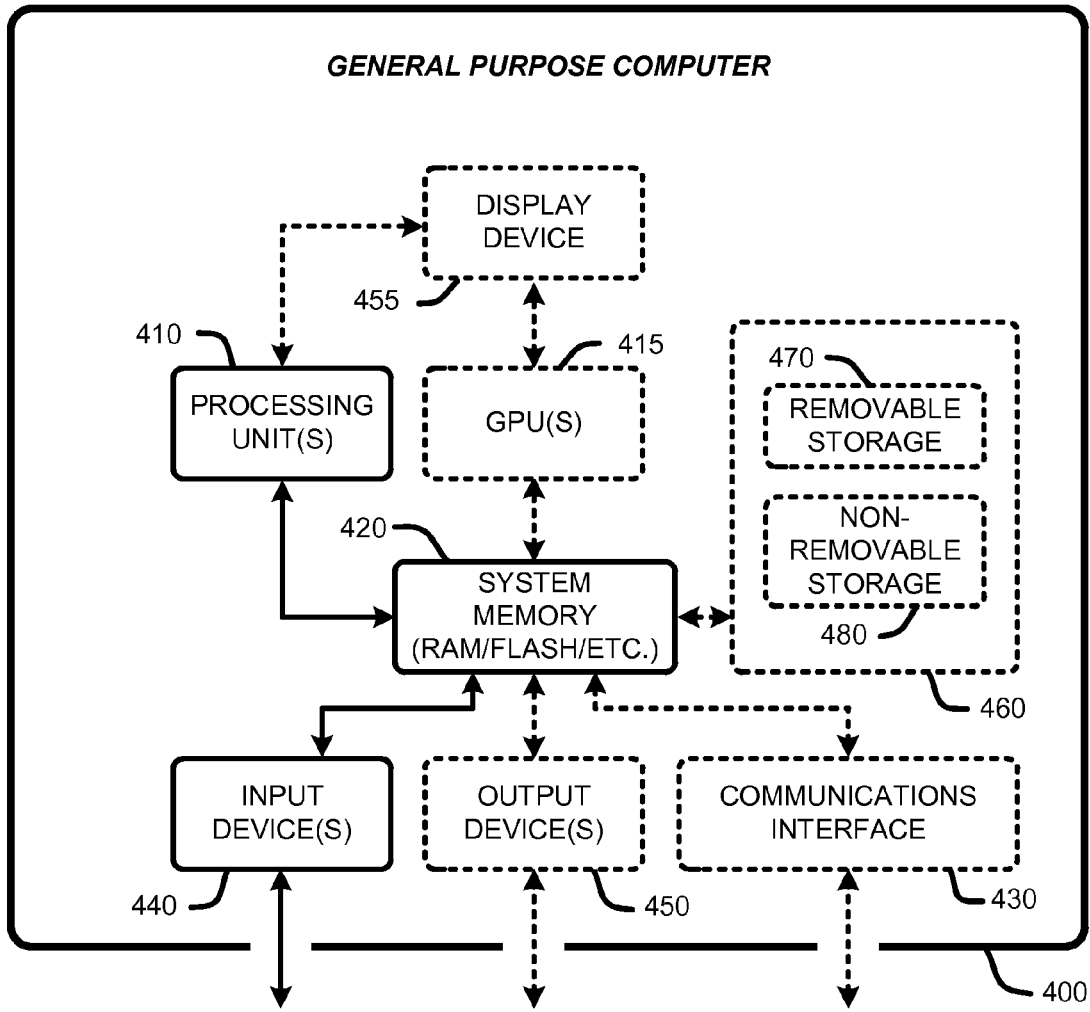
FIG. 4 is a general system diagram depicting a simplified general-purpose computing device having simplified computing and I/O capabilities for use in implementing various embodiments of the Wi-Fi Multicaster, as described herein.

4.0 Exemplary Operating Environments:

The Wi-Fi Multicaster described herein is operational within numerous types of general purpose or special purpose computing system environments or configurations. FIG. 4 illustrates a simplified example of a general-purpose computer system on which various embodiments and elements of the Wi-Fi Multicaster, as described herein, may be implemented. It should be noted that any boxes that are represented by broken or dashed lines in FIG. 4 represent alternate embodiments of the simplified computing device, and that any or all of these alternate embodiments, as described below, may be used in combination with other alternate embodiments that are described throughout this document.

For example, FIG. 4 shows a general system diagram showing a simplified computing device. Such computing devices can be typically be found in devices having at least some minimum computational capability, including, but not limited to, personal computers, server computers, hand-held computing devices, laptop or mobile computers, communications devices such as cell phones and PDA's, multiprocessor systems, microprocessor-based systems, set top boxes, programmable consumer electronics, network PCs, minicomputers, mainframe computers, video media players, etc.

To allow a mobile device having wireless connectivity to implement the "client proxy" component of the Wi-Fi Multicaster, the device should have a sufficient computational capability to "client proxy" functions described above. Typically, a device capable of performing the role of the "central controller" component will have both more storage capability and greater computational capabilities than a device hosting the "client proxy" software, though this is not always true or even required. In either case, as illustrated by FIG. 4, the computational capability of such devices is generally represented by one or more processing unit(s) 410, and may also include one or more GPUs 415. Note that that the processing unit(s) 410 of the general computing device of FIG. 4 may be specialized microprocessors, such as a DSP, a VLIW, or other micro-controller, or can be conventional CPUs having one or more processing cores, including specialized GPU-based cores in a multi-core CPU.

In addition, the simplified computing device of FIG. 4 may also include other components, such as, for example, a communications interface 430. The simplified computing device of FIG. 4 may also include one or more conventional computer input devices 440. The simplified computing device of FIG. 4 may also include other optional components, such as, for example, one or more conventional computer output devices 450. Finally, the simplified computing device of FIG. 4 may also include storage 460 that is either removable 470 and/or non-removable 480. Note that typical communications interfaces 430, input devices 440, output devices 450, and storage devices 460 for general-purpose computers are well known to those skilled in the art, and will not be described in detail herein.

The foregoing description of the Wi-Fi Multicaster has been presented for the purposes of illustration and description. It is not intended to be exhaustive or to limit the claimed subject matter to the precise form disclosed. Many modifications and variations are possible in light of the above teaching. Further, it should be noted that any or all of the aforementioned alternate embodiments may be used in any combination desired to form additional hybrid embodiments of the Wi-Fi Multicaster. It is intended that the scope of the invention be limited not by this detailed description, but rather by the claims appended hereto.

What is claimed is:

1. A computer-readable memory, having computer executable instructions stored therein for minimizing access point airtime consumed by multicast traffic in an 802.11-based Wi-Fi network, said instructions comprising causing a server computer to:

evaluate multicast subscription requests of a plurality of clients in wireless communication with one or more access points in the Wi-Fi network;

subscribe once to each unique multicast corresponding to each unique multicast subscription request on behalf of one or more multicast groups comprising one or more of the clients;

evaluate each client to perform an iterative "association control" process to assign each client to one of the access points, and sending the corresponding assignments to each client so that each client can associate with its assigned access point;

for each multicast group, performing a "destination control" process for identifying a single client having a lowest transmission rate with its assigned access point, and designating each such client as a "target client";

converting all subscribed multicasts to unicasts; and providing the unicasts to each access point having any clients subscribed to the corresponding multicast, and directing the access points to transmit the unicasts only to corresponding target clients;

wherein each client includes computer executable instructions for causing each client to:
receive each unicast transmissions corresponding to any multicast to which each client is subscribed;
decode the received unicasts using a shared security session key of the corresponding target client; and
convert the decoded unicasts to multicasts for local playback on each client.

2. The computer-readable memory of claim 1 wherein each client includes computer executable instructions for causing each client to generate a unique security session key for each multicast subscribed to by each client, and to transmit each generated security session key to the server via an access point associated with each client; and wherein all security session keys for each unique multicast are distributed by the server to all other clients subscribed to that unique multicast such that each corresponding client has a copy of the shared security session key of the corresponding target client.

3. The computer-readable memory of claim 1 wherein each client includes computer executable instructions for causing each client other than the target client for each multicast group to receive corresponding unicast transmissions by listening to those transmissions in promiscuous mode.

4. The computer-readable memory of claim 1 wherein the server further includes computer executable instructions for adding FEC packets to the unicasts provided to the access points for transmission to the target clients.

5. The computer-readable memory of claim 1 wherein each client further includes computer executable instructions for causing each client to periodically provide feedback information to the server, and wherein the server further includes computer executable instructions for responding to the client feedback to by periodically repeating the "association control" process and the "destination control" process.

6. A method for minimizing access point airtime consumed by multicast traffic in an 802.11-based Wi-Fi network, comprising steps for:

providing at least one server in communication with a plurality of wireless access points in an 802.11-based Wi-Fi network;

providing a plurality of clients capable of wireless communication with one or more of the access points;

on each client, intercepting each client generated multicast subscription request and sending each intercepted request to the at least one server via an initial access point associated with each client;

on the at least one server, subscribing to each unique multicast subscription request on behalf of a multicast group comprising one or more of the clients;

on the at least one server, performing an iterative "association control" process to assign each client to one of the access points, and sending the corresponding access point assignments to each client so that each client can associate with its assigned access point, said assignments operating to minimize airtime consumed by each access point;

on the at least one server, for each multicast group performing a "destination control" process to identify a single client having a lowest transmission rate with its assigned access point, and designating each such client as a "target client";

on the at least one server, converting each multicast to a unicast and providing each resulting unicast to each access point having assigned clients subscribed to the corresponding multicast group, and wirelessly transmitting each such unicast to each corresponding target client;

on each target client for each multicast group, directly receiving each corresponding unicast transmission;

on each other client for each multicast group, receiving packets of each corresponding unicast transmission intended for target clients by listening to those transmissions in a "promiscuous mode"; and on all clients, decoding received unicasts, converting the decoded unicasts to multicasts and providing local playback of the multicasts.

7. The method of claim 6 wherein each client includes a "virtual multicast interface" for each multicast subscribed to by that client, and wherein each "virtual multicast interface" includes a corresponding unique security session key.

8. The method of claim 6 wherein the at least one server adds FEC packets to the unicasts intended for one or more of the target clients.

9. The method of claim 6 further comprising steps for periodically repeating the destination control process for identifying the target clients for each access point.

10. The method of claim 6 further comprising steps for periodically repeating the association control process for assigning each client to one of the access points.

11. The method of claim 6 further comprising steps for repeating the association control process for assigning each client to one of the access points whenever any client joins or leaves any multicast group.

12. The method of claim 7 wherein each client shares each security session key with the at least one server, and wherein the at least one server distributes, via each corresponding access point, a copy of each security session key to each other client subscribed to the same multicast corresponding to the security session key of any other client.

13. The method of claim 12 wherein clients receiving unicast transmissions in promiscuous mode decode those transmissions using a corresponding one of the shared security session keys.

14. A system for minimizing access point airtime consumed by multicast traffic in a wireless network, comprising:

a subscription device on a server for evaluating multicast subscription requests of a plurality of clients in wireless communication with one or more access points in the wireless network, said subscription device acting to subscribe once to each unique multicast corresponding to each unique multicast subscription request on behalf of one or more multicast groups comprising one or more of the clients;

an association control device on the server for evaluating each client to perform an iterative "association control" process to assign each client to one of the access points, and sending the corresponding access point assignments to each client so that each client can associate with its assigned access point;

a destination control device on the server for identifying a single client, for each multicast group, having a lowest transmission rate with its assigned access point, and designating each such client as a "target client";

a multicast transmission device on the server for converting all multicasts to unicasts, providing the unicasts to one or more of the access points, and directing the access points to transmit the unicasts only to corresponding target clients; and a decoding device on each client, for each multicast group, for receiving the corresponding unicast transmissions, decoding the received unicasts using a shared security session key of the corresponding target client, and converting the decoded unicasts to multicasts for local playback on each client.

15. The system of claim 14 wherein each client further includes a "virtual multicast interface" device for generating a unique security session key for each multicast subscribed to by each client, and wherein: each security session key generated by each client is transmitted to the server via an access point associated with each client; and wherein all security session keys for each unique multicast are distributed by the server to all other clients subscribed to that unique multicast such that each corresponding client has a copy of the shared security session key of the corresponding target client.

16. The system of claim 14 wherein all clients other than the target client for each multicast group receive corresponding unicast transmissions by listening to those transmissions in promiscuous mode.

17. The system of claim 14 wherein the server further includes a device for adding FEC packets to the unicasts intended for one or more of the target clients.

18. The system of claim 14 wherein the destination control process for identifying the target clients for each access point is periodically repeated in response to feedback information provided by one or more of the clients to the server via the access point associated with each such client.

19. The system of claim 14 wherein the association control process for assigning each client to one of the access points is periodically repeated in response to feedback information provided by one or more of the clients to the server via the access point associated with each such client.

* * * * *